United States Patent [19]

Sisk

[11] 4,236,874
[45] Dec. 2, 1980

[54] DUAL CAPACITY COMPRESSOR WITH REVERSIBLE MOTOR AND CONTROLS ARRANGEMENT THEREFOR

[75] Inventor: Francis J. Sisk, Washington Township, Fayette County, Pa.

[73] Assignee: Westinghouse Electric Corp., Pittsburgh, Pa.

[21] Appl. No.: 16,638

[22] Filed: Mar. 2, 1979

Related U.S. Application Data

[62] Division of Ser. No. 873,291, Jan. 30, 1978, abandoned.

[51] Int. Cl.³ .................. F04B 35/00; F04B 49/00; F16H 21/20; F16C 3/28
[52] U.S. Cl. ............................. 417/315; 74/571M
[58] Field of Search ................ 417/315; 74/44, 571

[56] References Cited

U.S. PATENT DOCUMENTS

| | | | |
|---|---|---|---|
| 1,565,819 | 12/1925 | Saunders | 92/13.4 |
| 2,592,237 | 4/1952 | Bradley | 92/13.7 |
| 2,892,360 | 6/1959 | Egl | 92/13.7 |
| 2,943,782 | 7/1960 | McGregor | 74/44 |
| 3,010,339 | 11/1961 | Brock | 74/571 |
| 3,180,178 | 4/1965 | Brown et al. | 74/571 |
| 3,259,307 | 7/1966 | Ayling | 417/902 |
| 3,417,628 | 12/1968 | Paul, Jr. | 74/571 |
| 3,470,823 | 10/1969 | Seeger | 417/536 |

FOREIGN PATENT DOCUMENTS

42-48521 10/1967 Japan ........................... 92/134

*Primary Examiner*—William L. Freeh
*Attorney, Agent, or Firm*—E. C. Arenz

[57] ABSTRACT

A hermetic reciprocating compressor such as may be used in heat pump applications is provided for dual capacity operation by providing the crankpin of the crankshaft with an eccentric ring rotatably mounted thereon, and with the end of the connecting rod opposite the piston encompassing the outer circumference of the eccentric ring, with means limiting the rotation of the eccentric ring upon the crankpin between one end point and an opposite angularly displaced end point to provide different values of eccentricity depending upon which end point the eccentric ring is rotated to upon the crankpin, and a reversible motor in the hermetic shell of the compressor for rotating the crankshaft, the motor operating in one direction effecting the angular displacement of the eccentric ring relative to the crankpin to the one end point, and in the opposite direction effecting the angular displacement of the eccentric ring relative to the crankpin to the opposite end point, this arrangement automatically giving different stroke lengths depending upon the direction of motor rotation. The mechanical structure of the arrangement may take various forms including at least one in which any impact of reversal is reduced by utilizing lubricant passages and chambers at the interface area of the crankpin and eccentric ring to provide a dashpot effect.

In the main intended application of the arrangement according to the invention, that is, in a refrigerating or air conditioning system, it is desirable to insure a delay during reversal of the direction of compressor operation. A control arrangement is provided in which the control system controls the direction of motor operation in accordance with temperature conditions, the system including control means for effecting operation in a low capacity direction or alternatively in a high capacity direction in response to one set, and another set, respectively, of temperature conditions and with timer means delaying a restart of the compressor motor for at least a predetermined time in response to a condition of the control means operative to initiate a change in the operating direction of the compressor when it restarts.

3 Claims, 9 Drawing Figures

DUAL CAPACITY COMPRESSOR WITH REVERSIBLE MOTOR AND CONTROLS ARRANGEMENT THEREFOR

This is a division of application Ser. No. 873,291, filed Jan. 30, 1978, now abandoned.

CROSS REFERENCE TO RELATED APPLICATION

Riffe, U.S. patent application Ser. No. 873,295, filed Jan. 30, 1978 is a related application in that it describes an arrangement for a device in which the stroke length of a piston is also automatically changed in accordance with reversal of the motor direction, the Riffe arrangement differing from mine in that the top dead center position of his piston preferably remains fixed upon a change of motor direction, whereas in mine both the top dead center and the bottom dead center change upon a motor direction reversal.

BACKGROUND OF THE INVENTION

1. Field of the Invention

The invention pertains to the art of dual capacity hermetic refrigerant compressors for air conditioning and heat pump applications, and control arrangements therefor.

2. Discussion of Air Conditioning and Heat Pump Background

It has been determined from a study of heat pump economics for a heat pump operating in a heating mode that if the heat pump were capable of running efficiently at a lowered volumetric displacement on mild days while heating is occurring, and at a higher volumetric displacement on cold days, that this would provide definite economic advantages. One part of the problem with respect to heat pump capacities when operating in a heating mode is that the compressor capacity decreases at lower temperatures because of the lowered suction gas temperature and density so that the compressor is simply not fed a large enough quantity of refrigerant. Thus the compressor capacity is decreasing as the ambient temperature drops while the desirable condition would be that the capacity would be increasing as the temperature drops. Several ways of handling the problem is to provide multispeed compressors, or multiple and unloadable compressor cylinders or by oversizing the compressor to meet the heating needs, which will penalize the economics in northern situations with respect to the typical cooling needs and with respect to heating on milder days. It is my view that each of these arrangements for obtaining the capacity for heating has disadvantages as compared to an arrangement according to my invention.

3. Prior Patent Art Description

There are a significant number of prior patents teaching various means to change the output of a pump or other reciprocating member by changing the eccentricity of the orbiting means driving the connecting rod. Representative examples of such arrangements include U.S. Pat. Nos. 135,380; 2,592,237; 3,007,349; and 3,180,178, all of which provide the adjustment of the eccentricity is accomplished through means other than a simple reversal of rotation of the driving means for the device, such adjustments including manually rotating a gear or other arrangement as in the first three patents, and through a change in the hydraulic pressure of the lubricating system in the latter patent. I consider it unacceptable for a hermetic shell refrigerating compressor to be provided with any means external of the shell for providing the adjustment of eccentricity. The arrangement of the latter patent is also considered undesirable in that it calls for the hydraulic fluid actuated means to be mounted on the crankshaft and to rotate with it, as well as varying the lubrication pressure by either a manually operated pressure regulator or by an automatically operated pressure regulator controlled by the load on the air compressor which again would be undesirable with respect to a hermetic system.

It is not unknown in the patent art to provide arrangements in which variable stroke lengths are obtained through a reversal of direction of the driving means. U.S. Pat. No. 2,717,518 teaches a direction sensitive linkage lengthening arrangement particularly for use in depressed parking of vehicle windshield wipers. U.S. Pat. No. 3,482,458 teaches a dual stroke length mechanism particularly applicable to a reciprocating saw mechanism in which a pair of links associated with a rotating plate will give different stroke lengths depending upon the rotation of the plate. Neither of these arrangements would be suitable in a hermetic refrigeration compressor as a practical matter in my view, particularly because of the difference in magnitude of forces required in a compressor relative to that which linkages of the types disclosed could handle.

SUMMARY OF THE INVENTION

In accordance with the invention, a dual capacity hermetic compressor of the type in which a piston reciprocates in a cylinder includes a rotary crankshaft having an eccentric crankpin with an eccentric ring encompassing the crankpin and rotatable relative thereto, a connecting rod has one end encompassing the eccentric ring in rotatable relation and its other end connected to reciprocate a piston as the crankshaft rotates, means limiting the rotation of the eccentric ring relative to the crankpin between one end point and an opposite angularly displaced end point, the ring at the one end point adding the maximum eccentricity of the ring to the eccentricity of the crankpin and the ring at the opposite end point adding only a part of the maximum eccentricity of the ring to the eccentricity of the crankpin, so that with the ring at the one end point the stroke length of the rod is at the maximum and at the other end point the stroke length is reduced therefrom, and reversible motor means for rotating the crankshaft, the motor operating in one direction effecting the angular displacement of the ring relative to the crankpin to the one end point and in the opposite direction effecting the angular displacement of the ring relative to the pin to the opposite end point. The rotation limiting means may take various forms as will be detailed hereinafter.

In one form of the invention it includes means forming an arcuate shaped chamber through a predetermined angle at the interface area of the ring and crankpin with the chamber having one end point and an opposite end point, with means carried by the crankpin being movable through the circumferential extent of the chamber between the one and opposite end points to limit the rotation of the ring relative to the crankpin, and the crankpin includes lubricant passage means disposed to place the chamber in communication with the lubricant supply at both end point positions and to reduce the communication through at least a part of the movement of the means carried by the crankpin through the chamber to provide a dashpot effect throughout at least a part of the movement in both directions of the means carried by the crankpin to reduce the impact upon the parts upon a change in direction of the electric motor.

Finally, the invention includes a control arrangement for the compressor which controls the direction of the motor operation in accordance with temperature conditions, the control system including control means for effecting operation of the compressor in a low capacity direction or alternatively in a high capacity direction in response to one set, and another set, respectively, of temperature conditions, with means being provided to delay a restart of the compressor motor for at least a predetermined time in response to a condition of said control means which is operative to initiate a change in the operating direction of the compressor when it restarts.

DESCRIPTION OF THE PREFERRED EMBODIMENTS

Figure 1:
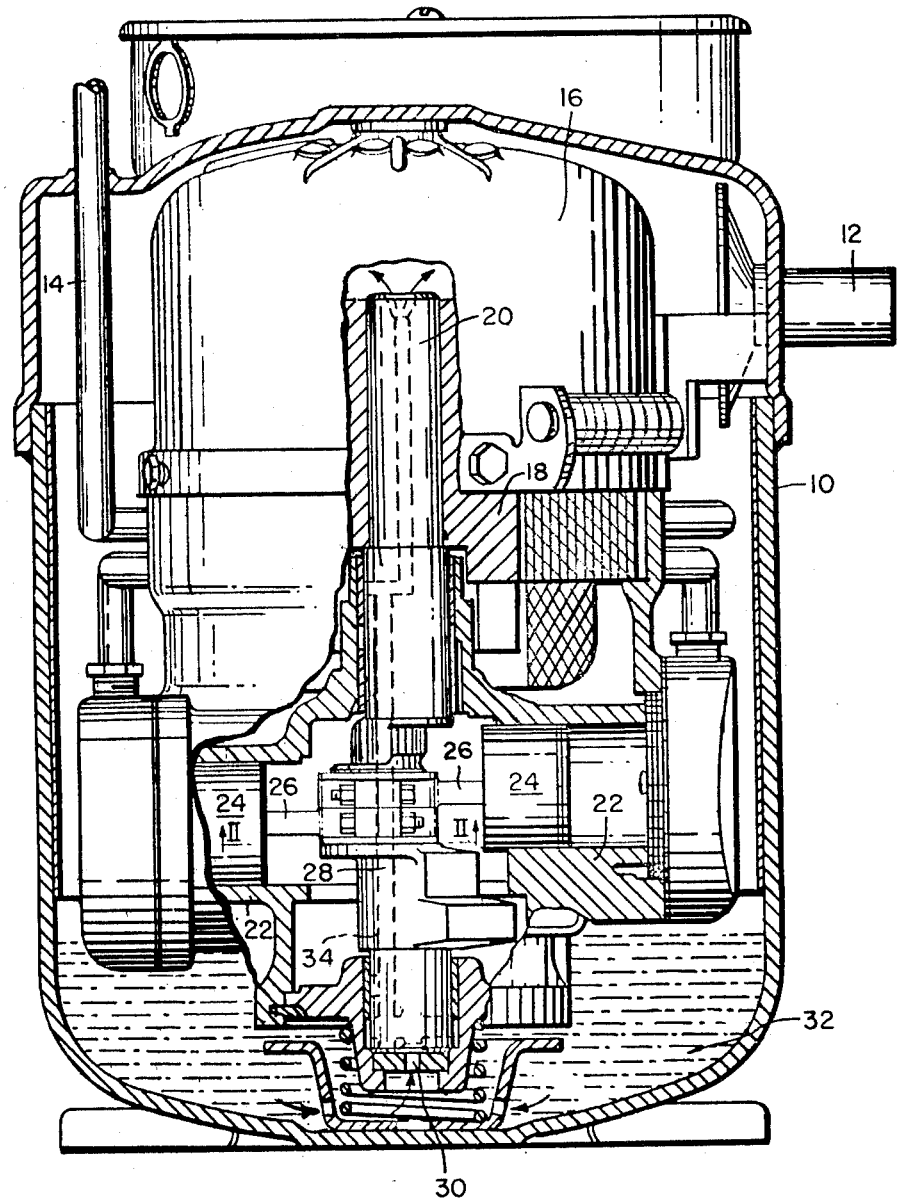
FIG. 1 is a side view of a hermetic refrigerant compressor representative of the type to which the invention may be applied with the shell shown in cross section and certain parts being broken.

The invention is applicable to hermetic refrigerant compressors having either a single or multiple cylinders although it is currently thought its best application is the latter. For purposes of describing and illustrating the invention, a hermetic refrigerant compressor representative of the type which may incorporate the invention is illustrated in FIG. 1. That compressor in many respects is generally the same as the one described in U.S. Pat. No. 3,259,307 to which reference should be had for an explanation of the overall structure of the compressor. However, a brief description of some of the basic parts of the compressor will be here made to promote an understanding of the way in which the invention may be incorporated in the compressor.

Referring to FIG. 1, the generally cylindrical, hermetically sealed shell 10 has an inlet 12 through which the suction gas refrigerant is admitted to the shell, and one or more discharge gas tubes 14 through which the compressed gas exits from the shell. The upper part of the shell houses a reversible electric motor 16 whose rotor 18 is fixed to the upper end of the crankshaft 20 to rotate the crankshaft in one direction or the other depending upon the direction of rotation of the rotor.

In the illustrated unit, the compressor has two cylinders 22 in which the two pistons 24 reciprocate as they are driven by the connecting rods 26 which of course have their one ends connected to the pistons and their other strap ends rotatably coupled to that lower portion 28 of the crankshaft which is provided with the crankpins of the crankshaft.

The extreme lower end portion of the crankshaft 28 includes lubricant inlet means 30 for admitting oil from the sump 32 into a vertically extending passage 34 in the crankshaft to carry oil to the bearings and so on as is detailed in the noted earlier patent on the compressor.

Figure 2:
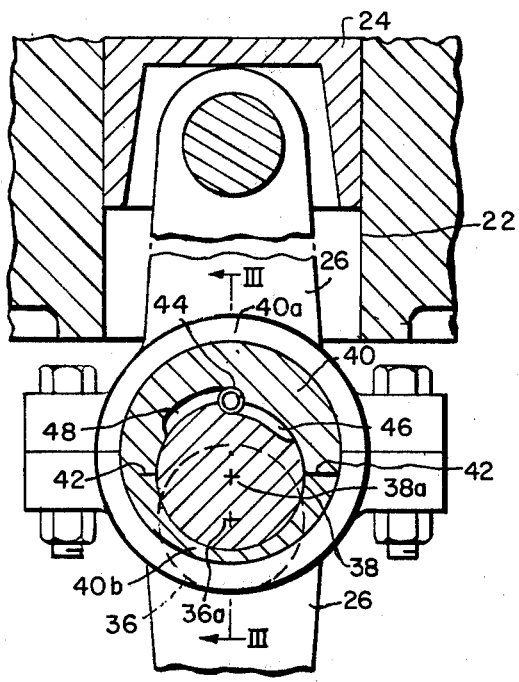
FIG. 2 is a partly broken section corresponding to one taken along the line II—II of FIG. 1.
Figure 3:
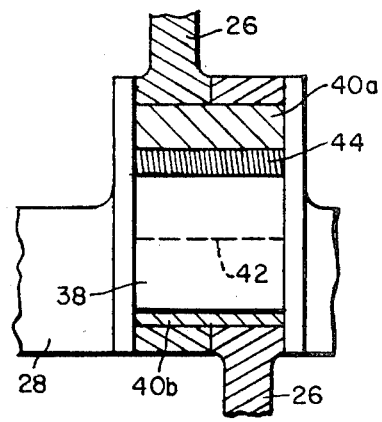
FIG. 3 is a fragmentary section corresponding to one taken along line III—III of FIG. 2.

Referring to FIGS. 2 and 3, the dash line circle 36 of FIG. 2 indicates the location of the part of the crankshaft 28 which is journaled in the main bearings while the solid line circle 38 shows the location of the eccentric crankpin relative thereto. 36a and 38a indicate the centerlines of the shaft and crankpin, respectively. An eccentric ring 40, which derives its eccentricity from the progressively varying wall thickness, is mounted on the crankpin 38 in rotatable relation therewith. The ring comprises an upper part 40a and a lower part 40b seperated by the parting lines 42 at diametrically opposite sides of the crankpin which permit the eccentric ring to be mounted on the crankpin. The eccentric ring is held in its position on the crankpin by the connecting rod strap 44 which encompasses the outer circumference of the ring 40.

In the embodiment shown in FIGS. 2 and 3, the means limiting the rotation of the eccentric ring relative to the crankpin comprises means located at the interface of the ring inner circumference and the crankpin outer circumference in the form of a key 44 which extends axially in one relieved area 46 extending along an arcuate portion of the outer circumference of the crankpin and another relieved area 48 extending along an arcuate portion of the inner circumference of the eccentric ring, the depth of the two relief areas each equaling half of the diameter of the key 44 which is interposed in the space formed between the two relieved areas.

Figure 4:
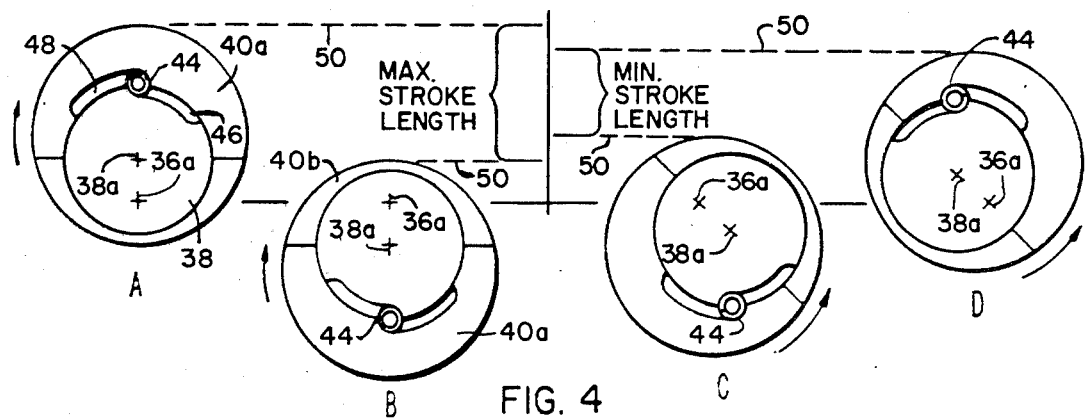
FIG. 4 is a diagrammatic view illustrating the change in stroke length obtained with the mechanism of FIGS. 2 and 3 when the motor drives the crankshaft in one direction and alternatively in the other direction.

Referring now to FIG. 4, it is there shown the way in which the means limiting the rotation of the eccentric ring relative to the crankpin between one end point and an opposite angularly displaced end point results in the addition of the maximum eccentricity of the ring to the eccentricity of the crankpin at the one end point, and at the opposite end point adding only a part of the maximum eccentricity of the ring to the eccentricity of the crankpin to give the change in stroke length. In FIG. 4A, the crankpin and ring are shown in a top dead center position under a condition of the crankpin rotating clockwise as indicated by the arrow. FIG. 4B shows the parts in a bottom dead center position under the clockwise rotation mode. The dash line 50 projections to the center of the drawing represent the maximum stroke length achieved under the clockwise rotation.

When the compressor has been stopped and restarted in the opposite direction by the reversible electric motor of the compressor, which in FIGS. 4C and D is indicated as counterclockwise, the crankpin 38 will turn within the eccentric ring 40 until limited in the relative rotation to the point where the two relieved area spaces 46 and 48 have reversed their relationship as compared to that in FIGS. 4A and B. In FIG. 4C the pin and ring are shown in a bottom dead center position under a counterclockwise rotating condition while in FIG. 4D they are shown in the top dead center position. Again the lines projected therefrom to the center of the page indicate the minimum stroke length achieved under the counterclockwise rotation.

As may be seen from the view of FIG. 3, a single crankpin and eccentric ring can be employed to change the stroke length of two connecting rods simultaneously.

In the arrangement of FIGS. 2-4, the key 44, which may take the form of a solid pin or if considered desirable a coil spring to somewhat cushion impact, is in non-fixed relation to both the crankpin and the ring.

Figure 5A:
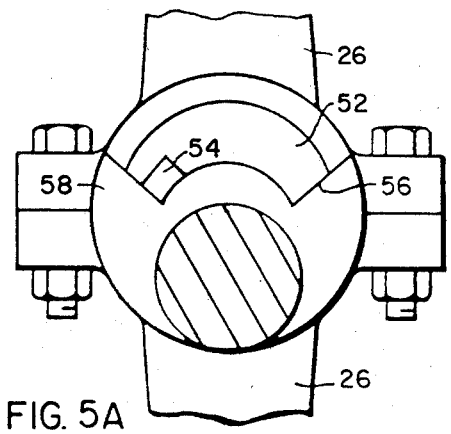
FIG. 5A is a fragmentary face view of a part of the FIG. 5 form.
Figure 5:
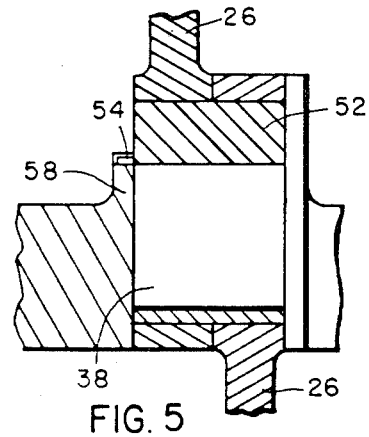
FIG. 5 is a side view as in FIG. 3 illustrating another form of the invention.

In the arrangement illustrated in FIG. 5, the rotation limiting means includes means having a fixed relation relative to the ring and movable relative to the crankpin. As shown in FIG. 5 and the fragmentary face view of FIG. 5A, the eccentric ring 52 is provided with a projecting dog 54 which is received in an arcuate cutout 56 in the crankshaft cheek or flange 58. This arrangement will function to give the same result as the first described embodiment, with the angular value of the cutout determining the change in stroke length. It will be appreciated that in this arrangement the change in eccentricity of the ring as the dog 54 is at one end point and at the opposite end point results in a change in distance of the dog from the centerline of the shaft. Accordingly, the cutout must provide clearance for this change or provide a bottom line of the cutout which is not concentric with the center of the crankshaft.

Figure 6:
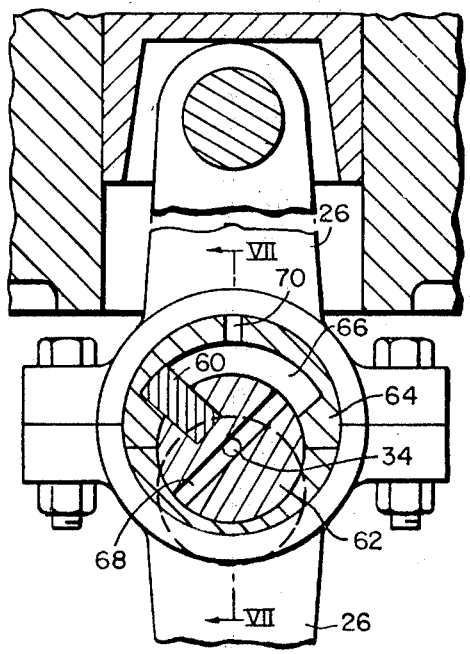
FIG. 6 is a sectional view of an eccentric mechanism in which the compressor lubricant is used with the structure to obtain a dashpot effect upon a restart of the compressor.
Figure 7:
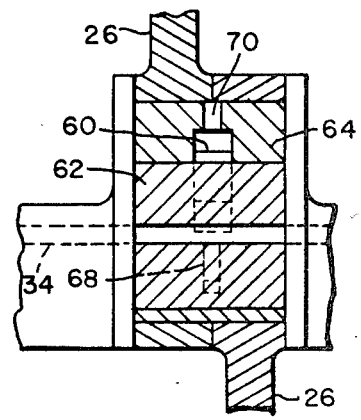
FIG. 7 is a partly broken side view of the mechanism of FIG. 6.

In the arrangement illustrated in FIGS. 6 and 7, the key 60 is fixed to the crankpin 62 and is movable relative to the eccentric ring 64, the radially outer part of the key being movable through an arcuate shaped chamber 66 which extends through a predetermined angle at the interface area of the ring and the crankpin, the chamber being formed in the radially inner part of the wall thickness of the ring 64. As noted in connection with FIG. 1, the crankshaft is provided with lubrication passages from which oil is drawn from the oil sump in the shell. Besides the axially extending passages in the shaft, radially extending passages are also conventionally formed to provide for lubrication in such compressors of the bearing area between the crankpin and connecting rod strap. As shown in FIGS. 6 and 7, a radial bore 68 is strategically located in the crankpin and in communication with the lubricant supply oil passage 34. An oil port is also provided in the ring 64 to provide a passage for oil to flow from the chamber 66 to the bearing surfaces between the ring and strap.

The way in which the dashpot effect is provided with the arrangement after the compressor has stopped with the key 60 in the illustrated position and upon a restart with the shaft rotating in a clockwise direction as viewed in FIG. 6 is as follows. The shaft and crankpin rotate clockwise inside the stationary eccentric ring with the key 60 pushing oil in the chamber ahead of it and out of the oil port 70 and back into the oil passage 68. As the key moves past the port 70 to close it, and with the crankpin having rotated within the ring correspondingly to close the passage 68, it now requires that any oil remaining in the chamber and ahead of the key 60 must be slowly forced out of the chamber through clearances in the assembly. After all of the oil has been slowly forced out through these clearances and the key reaches its opposite end point at the other end of the chamber, the one end of the lubricant passage 68 will now have reached a point where it is in communication with the chamber so that normal lubricant flow is reestablished. When the compressor again stops and restarts in the opposite direction, the same sequence will occur in reverse.

Control System

Typically in sizing heat pumps for northerly climates, the heat pump is sized to provide the required cooling capacity and this usually results in supplementary resistance heating being required at a temperature of, say, below 35° 1 F. (2° C.). In other words, the heating capacity of the unit in the northern climates does not match well the required cooling capacity. In using the arrangement of this invention, the approach is to provide a unit which in its high capacity mode can provide all of the heat required down to, say, a lower temperature of 20° F. ($-7$° C.). Thus in the air conditioning mode under ordinary circumstances the unit will be operating at the lower capacity as well as in its operation for heating during moderate temperatures, such as down to 35° F. (2° C.). Most of the high capacity operation would be in connection with providing heating during ambient temperature conditions below the 35° F. (2° C.). In other words, the unit of this invention would be sized to in effect have a reduced balance point of about 20° F. ($-7$° C.) so that supplemental resistance heat is only needed below that level. However, the arrangement is considered adaptable for use of dual capacity cooling in southerly climates where it would be possible that only the lower capacity heating would be required and perhaps no supplemental resistance heat at all.

Regardless of the way in which the unit is to operate and in whatever climate, in any situation in which a set of temperature conditions requires a change in the direction of operation following a stopping of the compressor, it is desirable, if not always necessary, that there be a time delay interposed to permit at least some degree of equalization of pressures in the refrigerant system.

Figure 8:
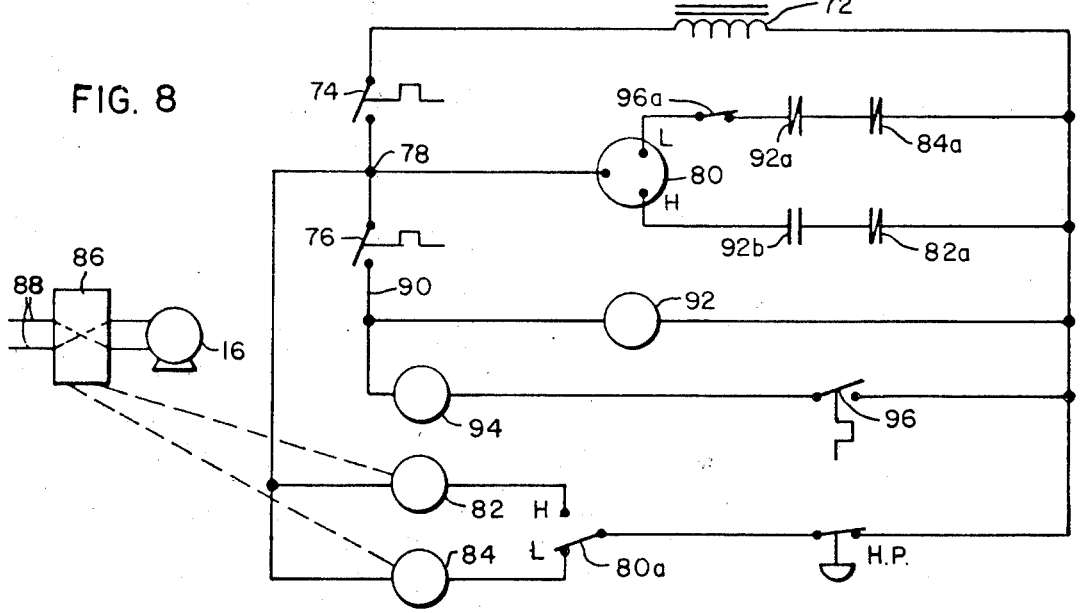
FIG. 8 is a schematic view of a control system according to the invention.

Referring now to the control schematic of FIG. 8, a source of low voltage power such as 24 volts is provided by transformer 72 which has one side connected to a first thermostatic switch 74 located in the served space and having a set point of a temperature corresponding to the served space demand temperature. For purposes of the detailed explanation to follow, the system will be considered to be operating in a heating mode so that examples of specific temperatures may be used. The circuit also includes a second thermostatic switch also located in the served spaces and having a set point of a different temperature from that of the first therostatic switch, this different temperature corresponding to a served space temperature which is more easily satisfied in accordance with whatever tempering (heating or cooling) operation is being carried out. For example, the thermostatic switch 74 may be set to be closed in a heating operation at a temperature below 70° F. (21° C.) which will be considered the demand temperature, while the second thermostatic switch 76 may have a set point so that it is closed at temperatures below 66° F. (19° C.). Thus the second thermostatic switch is more easily satisfied in a heating operation than the first thermostatic switch.

A common line 78 connects terminals of the two thermostatic switches as well as extending to a common terminal of a timer motor 80 which has a two position controlled switch 80a, line 78 also leads to two separate relay coils 82 and 84 which control reversing switch means 86 in the power line 88 to the motor 16. For purposes of explaining the operation, the relay coil 82 will be characterized as the high capacity coil in that it must be energized for the motor 16 to rotate in a direction which gives the high capacity to the compressor, while the low capacity coil 84 must be energized for the motor to be driven in the opposite direction to give the lower capacity of the compressor. In addition, the relay coils 82 and 84 also control the normally closed switches 82a and 84a in the timer motor circuit which will be explained hereinafter. One side of second thermostatic switch 76 is connected by line 90 to parallel circuits, one of which includes a relay coil 92 which controls normally closed switch 92a and normally open switch 92b, both in the timer circuit; and the other of which includes in series the electrical resistance heater relay coil 94 and an ambient temperature responsive switch 96 which controls switch 96a in the timer circuit.

Regarding the timer motor circuits, when all three of the switches 84a, 92a and 96a are closed, along with the first thermostatic 74 being closed, the timer motor will be energized for a period to drive the timer control switch 80a to the position shown in FIG. 8 which results in energization of the compressor in a low capacity direction. Compressor energization occurs without a time delay if the compressor had last run at lower capacity due to the timer motor control switch 80a being at the low capacity terminal position as shown in FIG. 8; or with a time delay if the compressor had last run in the higher capacity direction because the timer motor controlled switch 80a was in the high capacity terminal position. With the energization of the low capacity relay coil 84, the control switch 84a will result in deenergization of the timer motor 80 through the low side circuit and parking of the switch 80a in its low capacity position. If the operation of the compressor 16 in the low capacity direction provides adequate heat to satisfy the first thermostatic switch 74, it will then open and thereafter close again as the room temperature drops, with the compressor 16 cycling on and off in a low capacity direction.

If the compressor 16 operating in a low capacity direction does not have adequate capacity to maintain the room temperature above the set point of the second thermostatic switch 76, then that switch will close thereby energizing relay 92 causing opening of its controlled switch 92a and closing of its controlled switch 92b. With this condition the timer motor 80 will be energized in a direction to move its controlled switch 80a to the high capacity terminal opposite that shown in FIG. 8. This changing of the switch 80a position provides the time delay with the compressor 16 being deenergized as soon as the low capacity relay 84 is deenergized and with the time delay being adequate to provide some equalization of refrigerant pressures in the refrigerant circuit. When the switch 80a reaches the high capacity terminal position, the high capacity relay 82 is energized to start the compressor 16 in the high capacity direction, and the relay controlled switch 82a will open to effect parking of the switch 80a in the high capacity position.

Upon the room temperature rising to satisfy the second thermostatic switch 76 (the more easily satisfied one) it will open and deenergize relay 92. With the first thermostatic switch 74 unsatisfied and remaining closed, the compressor 16 will now be stopped due to the energization of the timer motor in its low side circuit since at this point each of the switches 84a, 92a and 96a are closed. When the timer controlled switch 80a reaches its low capacity terminal, the low capacity relay 84 will be energized to again operate the compressor 16 in the low capacity direction. Thus, it will be appreciated that in a period of moderate to moderately lower temperatures the compressor 16 can be cycled back and forth in low and alternatively high capacity direction with a time delay between each change in directions.

Now assume that there is a rapid drop in the ambient temperature so that ambient thermostatic switch 96 closes and its controlled switch 96a opens. If when this occurs the second thermostatic switch 76 is open, and the compressor 16 is operating in a low capacity direction because the switch 80a is in the low capacity position, it is possible for the first thermostatic switch 74 to cycle the compressor 16 on and off in a low capacity direction so long as the room space does not drop in temperature to that at which the second thermostatic switch closes. However, it would be expected that the compressor in its low capacity direction of operation would not have the capacity to maintain the desired room temperature, and accordingly, the second thermostatic switch 76 will close. This will result in operating the timer controlled switch 80a to the high capacity position and the energization of the compressor 16 in a high capacity direction. This will also result in the energization of the electrical resistance supplemental heat relay 94 to add the resistance heat to the space. With the ambient thermostat switch 96 remaining closed and the controlled switch 96a open, the timer motor cannot not now be energized in a direction to move the timer control switch 80a from a high capacity to a low capacity terminal position.

After the second thermostatic switch 76 opens in response to its satisfaction the electrical resistance heat is lost, but the compressor will continue to operate in the high capacity direction because the first thermostatic switch 74 remains closed. If the compressor has inadequate capacity to maintain the space temperature between the two set points of the thermostatic switches 74 and 76, the electrical resistance heat will cycle on and off through closure and opening respectively of the second thermostatic switch 76. However, it is also possible that the compressor operating in the high capacity direction will be adequate to satisfy the first thermostatic switch 74 and it will then open and stop the compressor. When the switch 74 closes again, the compressor will be energized in the high capacity direction, because the timer motor 80 cannot be energized in a direction for switching switch 88 to a low capacity position so long as the ambient temperature control switch 96a is open. Thus, the circuit arrangement has the capability of cycling the compressor 16 on and off in the high capacity direction through the cycling of the first thermostatic switch 74. In other words, cycling of the first thermostatic switch 74 does not correspond directly with cycling of the compressor motor 16 in its low capacity direction so long as the ambient temperature responsive switch 96a is open. The open condition of this switch 96a will insure that when the compressor runs it will be running in a high capacity direction regardless of how temperature conditions in the room are changing. In this case the second thermostatic switch 76 cycles to cycle electric heat on and off with the low outside temperature conditions.

While not considered likely it is possible that the heat pump could be used in northern places but not be provided with electrical resistance heating directly tied into the control circuit for the heat pump. In this case the branch circuit including the heater relay 94 and the ambient temperature responsive switch 96 could be omitted, but it may still be desirable to include the ambient temperature responsive switch 96a to insure that all compressor cycling at lower outdoor air temperatures occurs with the compressor operating in the high capacity direction.

As explained before, a heat pump designed for operation as described in northern climates will typically have more than adequate capacity with the compressor operating in the high capacity direction for the cooling needs in a northern climate.

For operation in the cooling mode the second thermostatic switch 76 is reset to a set point temperature higher than the set point temperature of the first thermostatic switch 74 and the sense of closing (close on rising temperatures) is reversed. As such, the second thermostatic switch is again the more easily satisfied switch and the system will operate with respect to high and low capacity directions of the compressor in the same general way as in the heating mode but with the high capacity direction of operation of the compressor occurring when the low capacity direction of operation gives inadequate cooling capacity to cause opening of the second thermostatic switch 76. An ambient temperatures responsive switch 96a may be provided and set at a relatively high temperature if desired to lock the system into high capacity operation if desired.

It is also conceivable that where the heat pump is to be used in climates of high humidity and high temperatures with no requirement for electrical resistance heating, dual capacity cooling may be the desirable feature with only the lower capacity heating being required.

While the degree of stroke reduction may be one value or another in accordance with the degree of eccentricity of the eccentric ring, as an example for purposes of this application the stroke reduction may be selected to be in the neighborhood of about 30%. Thus, with a high capacity stroke length of unity, and with a clearance ratio of say 5%, then when the stroke reduction of 30% is effected by the reversal of direction of compressor operation, the new clearance ratio for the reduced stroke length will be 28.6%. It will be appreciated that with the arrangement as shown, the length of stroke reduction is reduced from both the top dead center position and the bottom dead center position.

What is claimed is:

1. In a dual capacity hermetic refrigerant compressor of the reciprocating piston type:
   a rotary crankshaft having an eccentric crankpin rotating therewith;
   an eccentric ring having an inner and outer circumference mounted on said crankpin and rotatable relative thereto;
   a connecting rod having a strap end encompassing the outer circumference of said eccentric ring in rotatable relation and its other end connected to reciprocate a piston in a cylinder as the crankshaft rotates;
   means limiting the rotation of said ring relative to said crankpin between one end point and an opposite angularly displaced end point, said ring at said one-end point adding the maximum eccentricity of said ring to the eccentricity of said crankpin, said ring at said opposite end point adding only a part of the maximum eccentricity of said ring to the eccentricity of said crankpin, so that with said ring at said one end point the stroke length of said rod is at a maximum and at said other end point the stroke length is reduced therefrom;
   reversible motor means for rotating said crankshaft, said motor operating in one direction effecting the angular displacement of said ring relative to said crankpin to said one end point, and in the opposite direction effecting the angular displacement of said ring relative to said pin to said opposite end point;
   said rotation limiting means comprises key means located at the interface of said ring inner circumference and the crankpin outer circumference; and
   said crankpin includes a relieved area along an arcuate portion of its circumference, and said ring includes a relieved area along an arcuate portion of its inner circumference, and said key means is interposed in the space between said relieved areas.

2. In a dual capacity hermetic refrigerant compressor of the reciprocating piston type:
   a rotary crankshaft having an eccentric crankpin rotating therewith;
   an eccentric ring having an inner and outer circumference mounted on said crankpin and rotatable relative thereto;
   a connecting rod having a strap end encompassing the outer circumference of said eccentric ring in rotatable relation and its other end connected to reciprocate a piston in a cylinder as the crankshaft rotates;
   means limiting the rotation of said ring relative to said crankpin between one end point and an opposite angularly displaced end point, said ring at said one end point adding the maximum eccentricity of said ring to the eccentricity of said crankpin, said ring at said opposite end point adding only a part of the maximum eccentricity of said ring to the eccentricity of said crankpin, so that with said ring at said one end point the stroke length of said rod is at a maximum and at said other end point the stroke length is reduced therefrom;
   reversible motor means for rotating said crankshaft, said motor operating in one direction effecting the angular displacement of said ring relative to said crankpin to said one end point, and in the opposite direction effecting the angular displacement of said ring relative to said pin to said opposite end point;
   said crankpin and said eccentric ring both have an axial extent adequate to accommodate the strap ends of two connecting rods in side-by-side relation; and
   said compressor includes a second connecting rod in opposed relation to the first and having its strap end encompassing said eccentric ring in rotatable relation therewith adjacent the strap end of the first connecting rod.

3. In a dual capacity hermetic refrigerant compressor of the reciprocating piston type:
   a rotary crankshaft having an eccentric crankpin rotating therewith;
   an eccentric ring with an inner and outer circumference mounted on said crankpin and rotatable relative thereto;
   a connecting rod having one end encompassing the outer circumference of said eccentric ring in rotatable relation and its other end connected to reciprocate a piston in a cylinder as the crankshaft rotates;
   said ring and said crankpin including means forming an arcuate shaped chamber through a predetermined angle at the interface area of said ring and said crankpin, said chamber having one end point and an opposite end point;

means carried by said crankpin and movable through the circumferential extent of said chamber between the one and opposite end points to limit rotation of said ring relative to said crankpin;

said crankpin including lubricant passage means disposed to place said chamber in communication with a lubricant supply in both end point positions and to reduce the communication through at least a part of the movement of said means carried by said crankpin through the chamber to provide a dash pot effect throughout at least a part of said movement in both directions of said means carried by said crankpin; and reversible motor means for rotating said crankshaft, said motor operating in one direction effecting movement of said means carried by said crankpin through said chamber to said one end point and in the opposite direction effecting movement of said means carried by said crankpin to said opposite end point in said chamber, said chamber and said means carried by said crankpin being disposed relative to the eccentricity of said ring and said crankpin to provide different degrees of total eccentricity of said ring and crankpin at said one and said opposite end positions of said means carried by said crankpin.

* * * * *